US010011692B2

(12) United States Patent
Vogel et al.

(10) Patent No.: US 10,011,692 B2
(45) Date of Patent: Jul. 3, 2018

(54) HOLLOW FIBER MODULE HAVING TFC-AQUAPORIN MODIFIED MEMBRANES

(71) Applicant: Aquaporin A/S, Kongens Lyngby (DK)

(72) Inventors: Jörg Vogel, København S (DK); Jesper S. Groth, Hellerup (DK); Kent Høier Nielsen, Ølstykke (DK); Oliver Geschke, Kgs. Lyngby (DK)

(73) Assignee: Aquaporin A/S, Kongens Lyngby (DK)

( * ) Notice: Subject to any disclaimer, the term of this patent is extended or adjusted under 35 U.S.C. 154(b) by 9 days.

(21) Appl. No.: 14/610,504

(22) Filed: Jan. 30, 2015

(65) Prior Publication Data

US 2015/0144553 A1    May 28, 2015

Related U.S. Application Data

(63) Continuation of application No. PCT/IB2014/058096, filed on Jan. 7, 2014.

(30) Foreign Application Priority Data

Jan. 11, 2013 (GB) .................................. 1300465.0
Nov. 15, 2013 (DK) .................................. 2013 00650

(51) Int. Cl.
| | |
|---|---|
| *B01D 39/00* | (2006.01) |
| *B01D 39/14* | (2006.01) |
| *B01D 29/00* | (2006.01) |
| *B01D 67/00* | (2006.01) |
| *B01D 63/00* | (2006.01) |

(Continued)

(52) U.S. Cl.
CPC ............. *C08J 3/246* (2013.01); *B01D 63/023* (2013.01); *B01D 67/0006* (2013.01); *B01D 69/08* (2013.01); *B01D 69/125* (2013.01); *B01D 69/144* (2013.01); *B01D 71/56* (2013.01); *B01D 71/74* (2013.01); *B01D 71/80* (2013.01); *B01D 61/002* (2013.01); *B01D 61/025* (2013.01); *B01D 61/027* (2013.01); *B01D 71/70* (2013.01);

(Continued)

(58) Field of Classification Search
CPC .... B01D 61/025; B01D 71/56; B01D 69/125; B01D 2323/30; B01D 61/002; B01D 69/12; B01D 69/02; B01D 71/80; B01D 67/00; B01D 69/14
USPC ....... 210/500.38, 502.1, 490, 500.41; 264/41
See application file for complete search history.

(56) References Cited

U.S. PATENT DOCUMENTS

| | | |
|---|---|---|
| 3,130,156 A | 4/1964 | Neff |
| 3,637,488 A | 1/1972 | Li et al. |

(Continued)

FOREIGN PATENT DOCUMENTS

| | | |
|---|---|---|
| EP | 1518564 A2 | 3/2005 |
| EP | 2113298 A1 | 11/2009 |

(Continued)

OTHER PUBLICATIONS

Rong, Wang et al, Characterization of novel forward osmsosis hollow fiber membrane; Journal of membrane Science, 355(210) 158-167.*

(Continued)

*Primary Examiner* — Ana Fortuna
(74) *Attorney, Agent, or Firm* — Clark & Elbing LLP

(57) ABSTRACT

The present invention relates to a hollow fiber (HF) module having fibers modified with a thin film composite (TFC) layer comprising aquaporin water channels.

21 Claims, 4 Drawing Sheets

(51) Int. Cl.
*B01D 33/21* (2006.01)
*B05D 5/00* (2006.01)
*C08J 3/24* (2006.01)
*B01D 63/02* (2006.01)
*B01D 71/74* (2006.01)
*B01D 69/08* (2006.01)
*B01D 69/12* (2006.01)
*B01D 69/14* (2006.01)
*B01D 71/56* (2006.01)
*B01D 71/80* (2006.01)
B01D 61/00 (2006.01)
B01D 61/02 (2006.01)
B01D 71/70 (2006.01)

(52) U.S. Cl.
CPC ....... *B01D 2323/40* (2013.01); *C08J 2381/06* (2013.01); *C08J 2389/00* (2013.01)

(56) References Cited

U.S. PATENT DOCUMENTS

| | | | |
|---|---|---|---|
| 3,740,421 | A | 6/1973 | Schmolka et al. |
| 3,897,308 | A | 7/1975 | Li et al. |
| 3,906,250 | A | 9/1975 | Loeb |
| 4,193,267 | A | 3/1980 | Loeb |
| 4,277,344 | A * | 7/1981 | Cadotte .......... 210/654 |
| 4,360,448 | A | 11/1982 | Li et al. |
| 4,772,391 | A * | 9/1988 | Baker ............ B01D 69/125 210/490 |
| 4,781,733 | A | 11/1988 | Babcock et al. |
| 4,966,708 | A | 10/1990 | Oklejas et al. |
| 5,229,004 | A | 7/1993 | Skelland |
| 5,262,054 | A | 11/1993 | Wheeler |
| 5,340,480 | A * | 8/1994 | Kawata et al. ........ 210/500.23 |
| 5,741,416 | A | 4/1998 | Tempest, Jr. |
| 6,297,059 | B1 | 10/2001 | Song et al. |
| 7,014,531 | B2 | 3/2006 | Hansen |
| 7,208,089 | B2 * | 4/2007 | Montemagno et al. . 210/500.27 |
| 7,424,485 | B2 | 9/2008 | Kristiansen et al. |
| 7,563,370 | B2 | 7/2009 | Thorsen et al. |
| 7,566,402 | B2 | 7/2009 | Thorsen et al. |
| 7,713,544 | B2 | 5/2010 | Chaikof et al. |
| 7,857,978 | B2 * | 12/2010 | Jensen et al. .......... 210/652 |
| 8,123,948 | B2 | 2/2012 | Jensen |
| 9,278,316 | B2 | 3/2016 | Vissing et al. |
| 2001/0034432 | A1 | 10/2001 | Sodroski et al. |
| 2002/0107215 | A1 | 8/2002 | Brown et al. |
| 2003/0102263 | A1 | 6/2003 | Lopez et al. |
| 2004/0049230 | A1 * | 3/2004 | Montemagno et al. .......... 607/1 |
| 2007/0087328 | A1 | 4/2007 | Sleytr et al. |
| 2007/0105094 | A1 | 5/2007 | Fujita et al. |
| 2007/0199892 | A1 | 8/2007 | Peinemann et al. |
| 2007/0275480 | A1 | 11/2007 | Brander et al. |
| 2008/0234462 | A1 | 9/2008 | Yoo et al. |
| 2009/0007555 | A1 | 1/2009 | Jensen |
| 2009/0074988 | A1 | 3/2009 | Faris et al. |
| 2009/0308727 | A1 | 12/2009 | Kirts |
| 2010/0006495 | A1 * | 1/2010 | Buschmann ............ 210/500.25 |
| 2010/0178592 | A1 | 7/2010 | Cinquin et al. |
| 2010/0196203 | A1 | 8/2010 | Sanghera et al. |
| 2010/0270233 | A1 * | 10/2010 | Kim et al. ............. 210/490 |
| 2010/0294714 | A1 | 11/2010 | Buck et al. |
| 2011/0020950 | A1 | 1/2011 | Vogel et al. |
| 2011/0046074 | A1 | 2/2011 | Kumar et al. |
| 2011/0084026 | A1 * | 4/2011 | Freger et al. .......... 210/653 |
| 2011/0259815 | A1 * | 10/2011 | Montemagno .......... 210/500.23 |
| 2011/0284456 | A1 * | 11/2011 | Brozell .................. 210/500.21 |
| 2012/0080377 | A1 | 4/2012 | Jensen et al. |
| 2012/0152841 | A1 | 6/2012 | Vissing et al. |
| 2012/0255862 | A1 | 10/2012 | Dunnam et al. |
| 2013/0277307 | A1 | 10/2013 | Jensen et al. |
| 2014/0332468 | A1 * | 11/2014 | Tang et al. ............. 210/650 |
| 2015/0273407 | A1 | 10/2015 | Gil et al. |
| 2015/0360183 | A1 | 12/2015 | Jensen et al. |
| 2016/0016127 | A1 | 1/2016 | Mentzel et al. |

FOREIGN PATENT DOCUMENTS

| | | |
|---|---|---|
| JP | 2005-083765 A | 3/2005 |
| KR | 2010-0116344 A | 11/2010 |
| WO | WO-87/02380 A1 | 4/1987 |
| WO | WO-00/29337 A1 | 5/2000 |
| WO | WO-02/13955 A1 | 2/2002 |
| WO | WO-2004/011600 A2 | 2/2004 |
| WO | WO-2004/099088 A1 | 11/2004 |
| WO | WO-2006/122566 A2 | 11/2006 |
| WO | WO-2007/033675 A1 | 3/2007 |
| WO | WO-2007/035987 A1 | 4/2007 |
| WO | WO-2009/074155 A1 | 6/2009 |
| WO | WO-2009/076174 A1 | 6/2009 |
| WO | WO-2009/155596 A2 | 12/2009 |
| WO | WO-2010/091078 A2 | 8/2010 |
| WO | WO-2010/146365 A1 | 12/2010 |
| WO | WO-2013/039456 A1 | 3/2013 |
| WO | WO-2013/043118 A1 | 3/2013 |

OTHER PUBLICATIONS

Su et al., "Polyethersulfone Hollow Fiber Membranes for Hemodialysis," <http://www.intechopen.com/books/progress-in-hemodialysis-from-emergent-biotechnology-to-clinical-practice/polyethersulfone-hollow-fiber-membranes-for-hemodialysis >, retrieved on Mar. 9, 2015 (29 pages).
Clark et al., Properties of Membranes Used for Hemodialysis Therapy. Seminars in Dialysis. Clark, 191-195 (2002).
Fissell et al "Development of continuous implantable renal replacement: past and future", Trans Res. 150(6):327-336 (2007).
Aoike, "Required Water Quality for the Use of High-Performance Membranes," Contrib Nephrol. 173: 53-57 (2011).
Kotelyanskii et al., "Atomistic simulation of water and salt transport in the reverse osmosis membrane FT-30," J Memb Sci. 139: 1-16 (1998).
Maria Karlsson et al., "Reconstruction of water channel function of an aquaporin overexpressed and purified from Pichia pastoris," FEBS Lett. 537(1-3): 68-72 (2003).
"Ultrapes™ Membrane and P.E.T.® Technology" <http://www.membrana.com/index.php/21-uncategorised/146-liqui-fluxr-water-modules-product-information39>, retrieved on Jan. 27, 2015 (2 pages).
Niwa et al., "The protein metabolite hypothesis, a model for the progression of renal failure: an oral adsorbent lowers indoxyl sulfate levels in undialyzed uremic patients," Kidney Int Suppl. 62:S23-S28 (1997).
Niwa, "Uremic toxicity of indoxyl sulfate," Nagoya J Med Sci. 72(1-2):1-11 (2010).
Sukitpaneenit et al., "High performance thin-film composite forward osmosis hollow fiber membranes with macrovoid-free and highly porous structure for sustainable water production," Environ Sci Technol. 46(13): 7358-7365 (2012).
Yang et al., "Dual-Layer Hollow Fibers with Enhanced Flux as Novel Forward Osmosis Membranes for Water Production," Environ. Sci. Technol. 43(8):2800-2805 (2009).
Wang et al., "What makes an aquaporin a glycerol channel? A comparative study of AqpZ and GlpF," Structure. 13(8):1107-1118 (2005).
Xie, "Alteration of Membrane Properties during Continuous Hemofiltration Therapy in vivo," <http://darwin.bth.rwth-aachen.de/opus3/volltexte/2011/3556/pdf/3556.pdf>, retrieved on Mar. 11, 2015 (102 pages).
Zhao et al "Synthesis of robust and high-performance aquaporin-based biomimetic membranes by interfacial polymerization-membrane preparation and RO performance characterization", J Memb Sci. 423-424:422-428 (2012).
Zhong et al., "Development of Thin-Film Composite forward Osmosis Hollow Fiber Membranes Using Direct Sulfonated Polyphenylenesulfone (sPPSU) as Membrane Substrates," Environ. Sci. Technol. 47(13):7430-7436 (2013).
International Search Report for International Patent Application No. PCT/IB2014/058096, dated Mar. 25, 2014 (4 pages).

(56) References Cited

OTHER PUBLICATIONS

Lau et al., "A recent progress in thin film composite membrane: a review," Desalination. 287:190-9 (2012).

Norris et al., "High flux polyamide composite hollow fiber membranes for reverse osmosis applications," MRS Proceedings (MRS Spring Meeting). 930: Abstract (2006) (1 page).

Shi et al., "Effect of substrate structure on the performance of thin-film composite forward osmosis hollow fiber membranes," J Memb Sci. 382:116-23 (2011).

Verissimo et al., "Thin-film composite hollow fiber membranes: An optimized manufacturing method," J Memb Sci. 246:48-55 (2005).

U.S. Appl. No. 14/770,020, Mentzel et al.

Coury et al., "Reconstitution of water channel function of aquaporins 1 and 2 by expression in yeast secretory vesicles", Am J Physiol Renal Physiol. 274:34-42 (1998).

Cremer et al., "Formation and spreading of lipid bilayers on planar glass supports," J Phys Chem B. 103:2554-9 (1999).

Deamer et al., "Large volume liposomes by an ether vaporization method," Biochim Biophys Acta. 443(3): 629-34 (1976).

Hansen et al., "Formation of giant protein vesicles by a lipid cosolvent method," Chembiochem. 12(18):2856-62 (2011).

Hansen et al., "Large scale biomimetic membrane arrays," Anal Bioanal Chem. 395(3):719-27 (2009).

Hunter et al., "Effect of extrusion pressure and lipid properties on the size and polydisperity of lipid vesicles," Biophys J. 74(6):2996-3002 (1998).

Korikov et al., "Interfacially polymerized hydrophilic microporous thin film composite membranes on porous polypropylene hollow fibers and flat films," J Memb Sci. 279:588-600 (2006).

Lapointe et al., "Kinetics of carrier-mediated ion transport in two new types of solvent-free lipid bilayers," Biophys J. 39(2):141-50 (1982).

Leonenko et al., "Supported planar bilayer formation by vesicle fusion: the interaction of phospholipid vesicles with surfaces and the effect of gramicidin on bilayer properties using atomic force microscopy," Biochim Biophys Acta. 1509(1-2):131-47(2000).

Mayer et al., "Vesicles of variable sizes produced by a rapid extrusion procedure," Biochim Biophys Acta. 858(1):161-8 (1986).

Montal et al., "Formation of biomolecular membranes from lipid monolayers and a study of their electrical properties," Proc Natl Acad Sci U.S.A. 69(12):3561-6 (1972).

Mui et al., "Osmotic properties of large unilamellar vesicles prepared by extrusion," Biophys J. 64(2):443-53 (1993).

Planar Lipid Bilayers (BLMs) and their Applications, Membrane Science and Technology Series 7. Tien and Ottova-Leitmannova, 381-382, 450-454, 807-819, 825-829 (2003).

Reimhult et al., "Intact vesicle adsorption and supported biomembrane formation from vesicles in solution: influence of surface chemistry, vesicle size, temperature, and osmotic pressure," Langmuir. 19:1681-91 (2003).

Reviakine et al., "Formation of supported phospholipid bilayers from unilamellar vesicles investigated by atomic force microscopy," Langmuir. 16:1806-15 (2000).

Rinia et al., "Visualization of highly ordered striated domains induced by transmembrane peptides in supported phosphatidylcholine bilayers," Biochemistry. 39(19):5852-8 (2000).

Salafsky et al., "Architecture and function of membrane proteins in planar supported bilayers: a study with photosynthetic reaction centers," Biochemistry. 35(47):14773-81 (1996).

Schiermeier, "Water: purification with a pinch of salt," Nature. 452(7185):260-1 (2008).

Szoka et al., "Comparative properties and methods of preparation of lipid vesicles (liposomes)," Annu Rev Biophys Bioeng. 9:467-508 (1980).

Tang et al., "Desalination by biomimetic aquaporin membranes: Review of status and prospects," Desalination. 308:34-40 (2013).

Waldbillig et al., "Planar bilayer membranes from pure lipids," Biochim Biophys Acta 557(2):295-305 (1979).

Webber et al., "Hydrodynamic studies of adsorbed diblock copolymers in porous membranes," Macromolecules. 23:1026-34 (1990).

White, "Formation of "solvent-free" black lipid bilayer membranes from glyceryl monooleate dispersed in squalene," Biophys J. 23(3):337-47 (1978).

Zeidel et al., "Reconstitution of functional water channels in liposomes containing purified red cell CHIP28 protein," Biochemistry. 31(33):7436-40 (1992).

Oberg et al., "Glycosylation increases the theromostability of human aquaporin 10 protein," J Biol Chem. 286(36):31915-23 (2011) (19 pages).

Achilli et al., "Selection of inorganic-based draw solutions for forward osmosis applications," J Membr Sci. 364:233-41 (2010).

Al-Amoudi et al., "Fouling strategies and the cleaning system of NF membranes and factors affecting cleaning efficiency," J Membr Sci. 303:4-28 (2007).

Grosser, "The challenge: measure arsenic in drinking water," <http://www.watertechonline.com/articles/print/the-challeng-measure-arsenic-in-drinking-water>, dated Oct. 13, 2010, retrieved on Feb. 22, 2013 (5 pages).

Hill et al., "Use of aquaporins to achieve needed water purity on the international space station for the extravehicular mobility unit space suit system," in Proceedings of the 42nd International Conference on Environmental Systems, San Diego, CA, USA (2012) (16 pages).

James-Smith et al., "Role of ethylene oxide and propylene oxide groups of pluronics in binding of fatty acid to pluronics in microemulsions," J Surface Deterg. 11:237-42 (2008).

Kim et al., "Boron transport in forward osmosis: measurements, mechanisms, and comparison with reverse osmosis," J Membr Sci. 419-420:42-8 (2012).

Nagaishi et al., "A simple method for the precise determination of boron, zirconium, niobium, hafnium and tantalum using ICP-MS and new results for rock references samples," Geochemical Journal. 43:133-41 (2009).

Petrusevski et al., "Arsenic in drinking water," IRC International Water and Sanitation Centre. 17:1-57 (2007).

Phuntsho et al., "A novel low energy fertilizer driven forward osmosis desalination for direct fertigation: evaluating the performance of fertilizer draw solutions," J Membr Sci. 375:172-81 (2011).

Porcelli et al., "Chemical cleaning of potable water membranes: a review," Sep Purif Technol. 71:137-43 (2010).

Sam et al., "Composition and clinical use of hemodialysates," Hemodial Int. 10(1):15-28 (2006).

\* cited by examiner

HOLLOW FIBER MODULE HAVING TFC-AQUAPORIN MODIFIED MEMBRANES

FIELD OF THE INVENTION

The present invention relates to a hollow fiber (HF) module having thin film composite (TFC) modified fiber membranes, such as having a polyamide TFC layer on the outside or inside of the fibers, or on both sides, and comprising aquaporin water channels in said TFC layer. The present invention also relates to a hollow fiber membrane having a thin film composite (TFC) modified separation layer comprising aquaporin water channels, such as having a polyamide TFC layer on the outside or inside of the fibers and to a method of preparing said TFC modification directly on the fibers as mounted in the module and where said TFC layer comprises aquaporin water channels immobilised or embedded in said layer.

BACKGROUND OF THE INVENTION

Recently, it has been shown how thin film composite hollow fiber membranes can be prepared for forward osmosis (Sukitpaneenit & Chung 2012) through interfacial polymerization creating a polyamide thin layer on the inner surface of PES hollow fiber support membranes where a 2 wt % of meta-phenylene diamine (MPD) aqueous solution containing 0.5 wt % of triethylamine and 0.1 wt % of sodium dodecyl sulfate is introduced through pumping from a bottom inlet into a vertically positioned HF module followed by air drying and then introduction of a 0.15 wt % of trimesoyl chloride (TMC) in hexane solution to form the polyamide thin film and finally purging with air and curing at 65° C., rinsing with deionized water and storing in deionized water. Furthermore, Peinemann et al. describes a method of preparing a similar TFC layer on the interior surface of a hollow fiber, cf. US published patent application No. 2007/0199892. Moreover, Zhong et al. (2013) describe the development of TFC forward osmosis hollow fiber membranes using direct sulfonated polyphenylenesulfone as membrane substrate. However, for a wide range of separation applications where hollow fiber modules are employed it is of importance to be able to separate or filter out organic solutes of relatively low molecular weight during the filtration process. For example, in haemodialysis where HF modules are widely used, a uremic toxin and organic degradation product, such as indoxyl sulfate (Indoxyl sulfate potassium salt, CAS Number 2642-37-7, molecular weight 251.30) poses a particularly difficult problem. Indoxyl sulfate is accumulated in the serum of chronic kidney disease patients. A part of the dietary protein-derived tryptophan is metabolized into indole by tryptophanase in intestinal bacteria. Indole is absorbed into the blood from the intestine, and is metabolized to indoxyl sulfate in the liver. Indoxyl sulfate is normally excreted into urine. In haemodialysis patients, however, an inadequate renal clearance of indoxyl sulfate leads to its elevated serum levels, cf. Niwa T. (2010). Niwa et al. (1997) have advanced the hypothesis that accumulation of indoxyl sulfate accelerates glomerular sclerosis and progression of kidney disease. Administration of an oral adsorbent lowers indoxyl sulfate levels in undialyzed uraemic patients, cf Niwa et al. (1997). Current dialysis methods, i.e. haemodialysis and peritoneal dialysis, the latter being characterised by continuous ultrafiltration and solute removal, do not sufficiently remove some low molecular weight degradation products from serum, such as indoxyl sulfate and p-cresol (4-methylphenol, CAS No. 106-44-5, molecular weight 108.13). In addition, small water-soluble molecules, such as urea, uric acid and creatinine, and peptides/proteins, such as β2-microglobulin should preferably be removed during dialysis. A direct association between p-cresol, mainly reflecting p-cresyl sulfate, and overall mortality and cardiovascular disease in end-stage renal disease and in chronic kidney disease has been found. Likewise, direct associations between indoxyl sulfate and overall mortality and cardiovascular disease has been reported. In continuous hemofiltration therapy loss of physiological (vital) proteins should be minimized and removal of low (<500 Da) and middle molecular weight (from about 500 to about 40 kDa) uremic toxins and peptides should be optimized, cf. Wenhao Xie (2011).

Aoike (2011) mentions the most important features or quality parameters for high performance membranes for use in hemopurification therapies, i.e., high water permeability, capability to remove a wide range of uremic toxins and other characteristic features. However, Aoike also points out that large pore size of existing high performance membranes (HPM) will likely allow blood to be contaminated by the dialysis fluid, because HPMs, such as polyacrylonitrile (PAN) membranes, having a large pore size allow untoward rapid diffusion of dialyzed endotoxin fragments back into the blood compartment.

Accordingly, it remains a problem in the art in providing hollow fiber modules that are able to separate low molecular weight compounds, enabling their removal from liquids in processes such as haemodialysis and in which the hollow fibre module combine a high water permeability with smaller pore sizes.

SUMMARY OF THE INVENTION

Broadly, the present invention provides a hollow fiber module which is able to separate low molecular weight compounds, for example enabling the HF module to concentrate organic compounds, including urea, indoxyl sulfate, p-cresol and/or p-cresyl sulfate and preferably compounds having a molecular weight of less than about 500 Da and thus enable improved removal of said compounds, e.g. from a liquid. Alternatively or additionally, the present invention aims to provide a hollow fiber module having high water permeability but with smaller pore sizes, such as having a pore diameter of less than about 5 to 10 nm, cf. Clark & Gao (2002).

Accordingly, in one aspect, the present invention provides a hollow fiber (HF) module having a TFC layer comprising aquaporin water channels formed on its fiber surfaces, such as the inner fiber surface (lumen).

In a further aspect, the present invention provides a method of preparing a hollow fiber module comprising HF membranes modified with a thin film composite (TFC) layer comprising aquaporin water channels, said method comprising the steps of:
  a) obtaining an aquaporin vesicles suspension (proteoliposomes or proteopolymersomes) having from about 25 to about 500 LPR/POPR of protein,
  b) preparing an aqueous solution of a di- or triamine,
  c) dissolving a di- or triacyl halide in an apolar organic solvent,
  d) preparing a mixture of amine and aquaporin vesicle by dissolving/mixing the vesicles preparation from step a) with the solution from step b),
  e) pumping the mixture from step d) through the lumen of the hollow fibers in a hollow fiber module using its end inlet, f) removing excess aqueous solution by a gas purging of the lumen side of the fibers using a module inlet, g) injecting the acyl halide solution from step c) into the module through the lumen of the hollow fibers to allow an interfacial polymerization reaction to take place, and h) rinsing the module with an aqueous solvent by injection through a module inlet.

In a further aspect, the present invention provides a method of preparing a hollow fiber module comprising HF membranes modified with a thin film composite (TFC) layer comprising aquaporin water channels, said method comprising the steps of a) obtaining an aquaporin vesicles suspension (proteoliposomes or proteopolymersomes) having from about 25 to about 500 LPR/POPR of protein, b) preparing an aqueous solution of 1,3-diaminobenzene of about 1% to about 5% (w/w) concentration, c) dissolving benzene-1,3,5-tricarbonyl chloride in an organic solvent selected from the group consisting of hexane, heptane, octane or a mixture of solvents to obtain a concentration of about 0.05% to about 1% (w/v), d) preparing an 1,3-diaminobenzene/aquaporin vesicle mixture by dissolving/mixing the vesicles preparation from step a) with the solution from step b), e) pumping the mixture from step d) through the lumen of the hollow fibers in a hollow fiber module using its end inlet, f) removing excess aqueous solution by a gas purging of the lumen side of the fibers using a module inlet, g) injecting the benzene-1,3,5-tricarbonyl chloride solution from step c) into the module through the lumen of the hollow fibers to allow an interfacial polymerization reaction to take place, and h) rinsing the module with an aqueous solvent by injection through a module inlet.

In a further aspect, the present invention provides a method of outside coating a hollow fiber membrane with a thin film composite (TFC) layer comprising aquaporin water channels, said method comprising the steps of:

a) obtaining an aquaporin vesicles suspension (proteoliposomes or proteopolymersomes), b) preparing an aqueous solution of a di- or triamine, c) dissolving a di- or triacyl halide in an apolar organic solvent, d) preparing a mixture of amine and aquaporin vesicle by dissolving/mixing the vesicles preparation from step a) with the solution from step b), e) passing the hollow fiber membrane through the mixture from step d), f) removing excess aqueous solution, g) passing the hollow fiber membrane through the acyl halide solution from step c) to allow an interfacial polymerization reaction to take place, and h) rinsing the hollow fiber membrane with an aqueous solvent, e.g. by passing the hollow fibre through a water bath.

Moreover, the invention relates to a hollow fiber membrane modified with a thin film composite (TFC) layer comprising aquaporin water channels.

In a further aspect, the present invention provides the use of into a hollow fiber (HF) module as described herein for extraction of pure water through forward osmosis or for re-extraction of pure water from a patient's plasma lost through hemodialysis In a further aspect, the present invention provides a method of extracting water from an aqueous liquid comprising the following steps:

a) placing a hollow fiber (HF) module of any one of claims 1 to 9 which is in controlled connection with a first aqueous liquid (feed solution) having an osmotic pressure which is lower than or equal to that of the liquid membrane matrix, and which is further in controlled connection with a second aqueous liquid (draw solution) having an osmotic pressure which is higher than that of the matrix to create an osmotic pressure potential between said first and said second liquid, b) allowing the matrix to absorb pure water from said first liquid and to mediate a pure water flux into said second liquid as long as an osmotic pressure gradient exists, c) optionally separating the extracted pure water from said second liquid.

Embodiments of the present invention will now be described by way of example and not limitation with reference to the accompanying figures. However various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

DETAILED DESCRIPTION

Figure 1A:
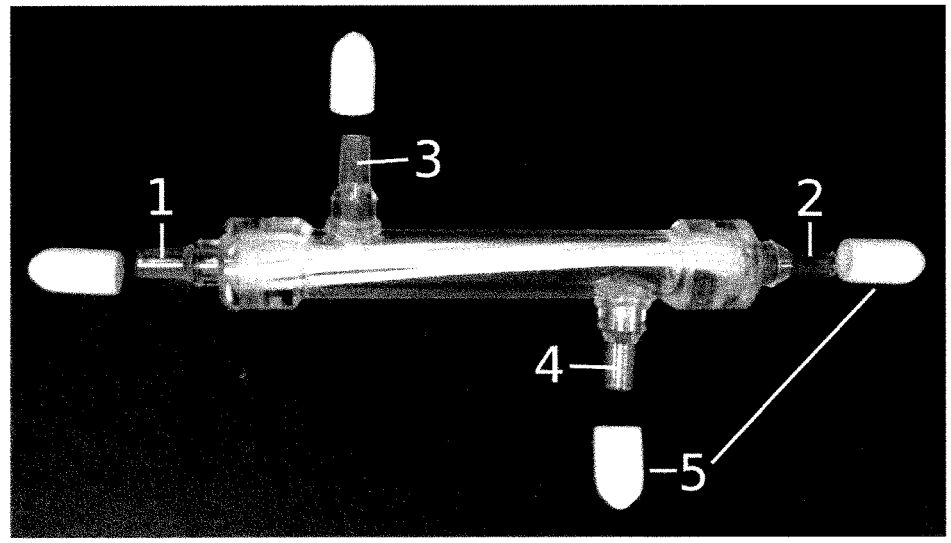
FIG. 1A shows as a photograph and a drawing a HF module having 9 hollow fibers, two end inlets/outlets (1, 2) and two side inlets/outlets (3, 4) as well as four end caps (5) to seal said inlets/outlets. Total length of the module: 100 mm; diameter at fibers: 10 mm; diameter at sealing: 130 mm.
Figure 1A:
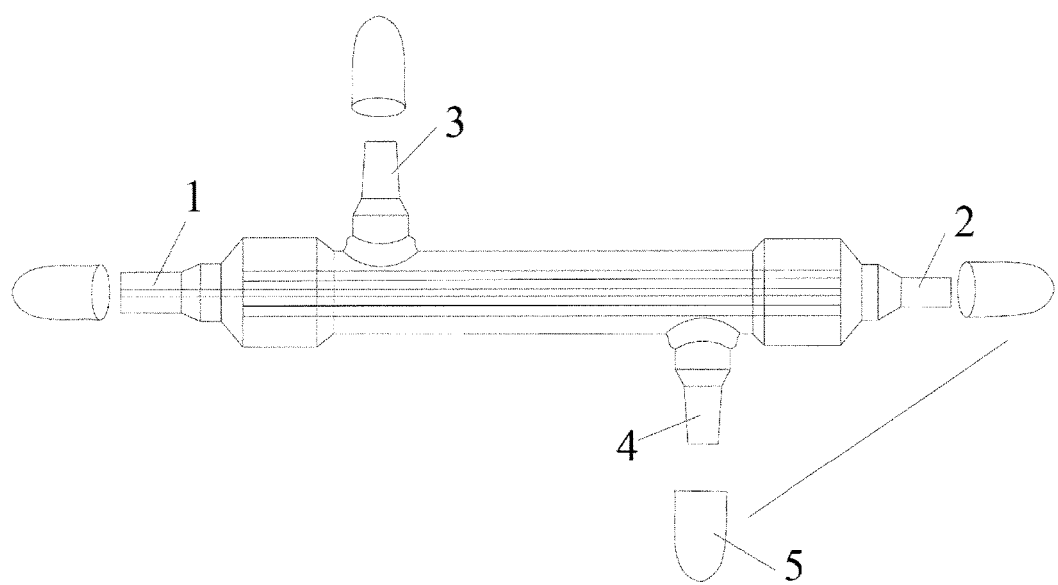
Figure 1B:
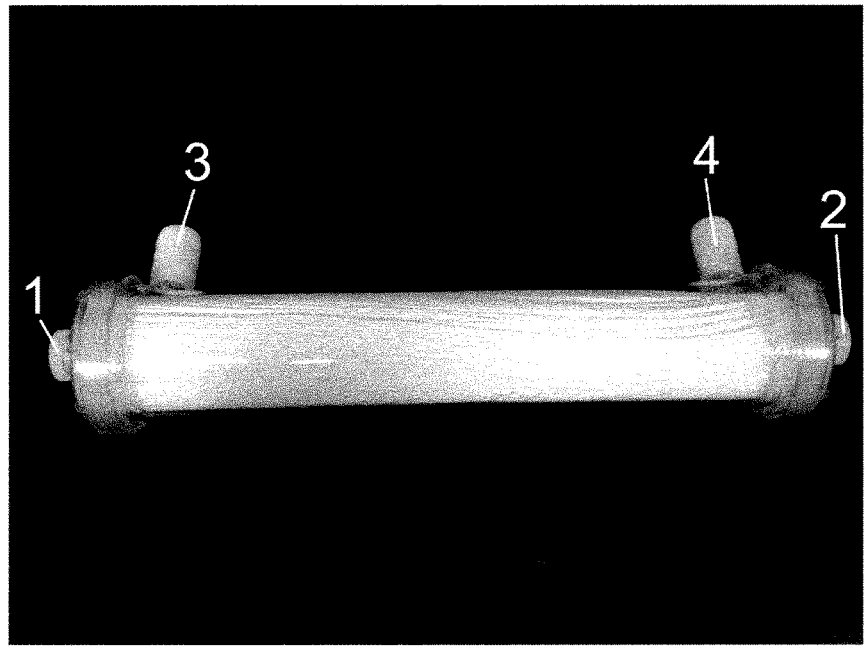
FIG. 1B shows as a photograph and a drawing a HF module having 984 fibers, two end inlets/outlets (1, 2) and two side inlets/outlets (3, 4). Total length: 25 cm, fiber diameter of 700 μm.
Figure 1B:
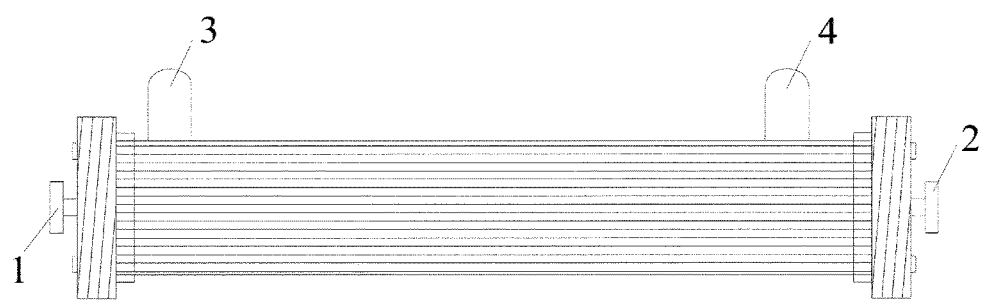

More specifically, the present invention relates to a HF module having polyethersulfone (PES) fibers or fibers of other suitable porous support material, such as polysulfone, polyphenylene sulfone, polyether imide, polyvinylpyrrolidone and polyacrylonitrile including blends and mixtures thereof, which has been modified by forming a thin film composite layer, e.g. through interfacial polymerization. In addition, various doping materials may be used when manufacturing the hollow fiber support materials, cf. e.g. Qian Yang et al. (2009). Such HF modules are commonly used in food and beverage applications such as filtering beer and wine, but also in some water and wastewater applications including wastewater reuse and pool water recycling. For instance, the German company Membrana supplies a hollow fiber module containing several thousands of fibers with an overall surface area of 75 square meters per module. Smaller modules with typically 1-2 square meters and around 8,000 to 20,000 fibers are commonly used in medical dialysis applications (Fresenius Medical Care, Gambro). In principle, all these commercial products can be coated through interfacial polymerization using the method of the invention resulting in a thin film composite layer wherein aquaporin water channels are incorporated, preferably during its formation, such as by adding a suitable protein suspension or solution, preferably in vesicle form, to the aqueous reactive amine solution, e.g. a meta-phenylene diamine solution, and pumping or injecting the combined solution through the support fibers, removing excess solution and subsequently pumping or injecting a reactive acyl chloride in organic solvent, e.g. trimesoyl chloride in hexane, and finally rinsing with deionized water, e.g. MilliQ™ water. The housing material of the HF modules of the invention can be any suitable material commonly used for HF modules, such as polypropylene, polyethylene, PVDF and stainless steel. The fibers may be sealed into the HF module housing using commonly known epoxy adhesive materials and the like. Additional examples of HF modules that may be TFC modified according to the invention are found on websites of membrane producers, such as:

http://www.membranafiltration.com/filtration-modules/documentation.cfm http://www.kochmembrane.com/PDFs/KMS_Puron_Hollow_Fiber_PSH300_PSH600_PSH1800_Modul.aspx http://www.kochmembrane.com/Membrane-Products/Hollow-Fiber/Ultrafiltration/PURON-Series.aspx http://www.daicen.co.jp/english/membrane/kogata.html http://www.spectrumlabs.com/filtration/hfmods.html http://www.microdyn-nadir.com/en/Products/

In one embodiment of the present invention, the HF module is operated with counter-current flow of draw and feed solutions. In another embodiment of the present invention the HF module is operated with co-current flow of draw and feed solutions. In a further embodiment of the invention the HF module is operated with the draw solution against the TFC layer. In a still further embodiment of the invention the HF module is operated with the feed solution against the TFC layer. In addition, the modified hollow fibres of the invention may be mounted in a system or module for use as a membrane bio-reactor (MBR), where the MBR module containing the hollow fibres is submerged in an aqueous liquid and where purified water is removed from said liquid through the fibres by the use of a draw solution or by application of a moderate suction pressure.

A further aspect of the invention relates to a method of making a hollow fiber membrane modified with a thin film composite (TFC) layer comprising aquaporin water channels, where the TFC layer comprising aquaporin water channels is prepared directly on the surface of membrane fibers mounted and sealed in a HF module, said method comprising the steps of:
 a) obtaining an aquaporin vesicles suspension (proteoliposomes or proteopolymersomes) having from about 25 to about 500 LPR/POPR (ratio based on mole content) (preferably 100 LPR/POPR for lipid/diblock copolymer, 50 POPR for triblock copolymer) of protein,
 b) preparing an aqueous solution of a diamine, such as 1,3-diaminobenzene, to obtain a solution of about 1% to about 5%, such as about 2.5 to 4.2% (w/w) concentration,
 c) dissolving an acyl chloride, such as benzene-1,3,5-tricarbonyl chloride in a hydrocarbon solvent, such as hexane, heptane, octane, nonane having a straight or branched hydrocarbon chain to or mixtures of these, such as isoalkane hydrocarbon solvent obtain a concentration of about 0.05% to about 1%, such as about 0.15% (w/v),
 d) preparing a diamine/aquaporin vesicle mixture, such as 1,3-diaminobenzene/aquaporin vesicle mixture by dissolving/mixing the vesicles preparation from step a) with the solution from step b),
 e) pumping the mixture from step d) through the lumen of the hollow fibers in a hollow fiber module using its end inlet,
 f) removing excess diamine by a gas purging of the lumen side of the fibers using a module inlet,
 g) injecting the acyl chloride solution from step c) into the module through an inlet to allow an interfacial polymerization reaction to take place, and
 h) rinsing the module with an aqueous solvent by injection through a module inlet.

Optionally, after filling with water the module is sealed with tight caps to prevent it from drying out.

A further aspect of the invention relates to a method of outside coating a hollow fiber membrane with a thin film composite (TFC) layer comprising aquaporin water channels, said method comprising the steps of:
 a) obtaining an aquaporin vesicles suspension (proteoliposomes or proteopolymersomes),
 b) preparing an aqueous solution of a di- or triamine,
 c) dissolving a di- or triacyl halide in an apolar organic solvent,
 d) preparing a mixture of amine and aquaporin vesicle by dissolving/mixing the vesicles preparation from step a) with the solution from step b),
 e) passing the hollow fiber membrane through the mixture from step d),
 f) removing excess aqueous solution,
 g) passing the hollow fiber membrane through the acyl halide solution from step c) to allow an interfacial polymerization reaction to take place, and
 h) rinsing the hollow fiber membrane with an aqueous solvent, e.g. by passing the hollow fibre through a water bath.

In the above described methods of coating the hollow fiber membrane and preparing the hollow fiber module, the steps a)-c) may be performed in any convenient order. Also the step c) may be performed before or after step d).

In exemplary embodiments, said liposomes used in the preparation of the HF module of the invention are prepared from lipids such as DPhPC, DOPC, mixed soy bean lipids, such as asolectin and soy lecithin, or *E. coli* mixed lipids; and said polymersomes may comprise triblock copolymers of the hydrophile-hydrophobe-hydrophile (A-B-A or A-B-C) type or diblock copolymers of the hydrophile-hydrophobe type (A-B).

In a further embodiment said polymersomes may comprise a combination of triblock copolymers of the hydrophile-hydrophobe-hydrophile type and diblock copolymers of the hydrophile-hydrophobe type. In the combinations the diblock copolymers may comprise from about 10 mole % to about 60 mole %, such as from about 25 mole % to about 50 mole %.

Said aquaporin water channels are preferably AqpZ channels, but, in principle, all water selective aquaporins, e.g. such as aquaporin Z (AqpZ), Aqp1, GlpF or SoPIP2;1, are useful in the invention.

Said TFC layer is preferably formed through interfacial polymerization of an aqueous solution of an amine with a solution of an acid chloride in an organic solvent, and wherein the aquaporin water channel vesicles are incorporated in said aqueous solution. Said aquaporin water channels are preferably incorporated in vesicles before incorporation into the TFC layer of the hollow fiber membrane of the invention, and said vesicles may be in the form of liposomes or polymersomes, where said liposomes are prepared from lipids such as DPhPC, DOPC, mixed soy bean lipids, or E. coli mixed lipids, and said polymersomes comprise triblock copolymers of the hydrophile-hydrophobe-hydrophile (A-B-A or A-B-C) type or diblock copolymers of the hydrophile-hydrophobe type (A-B). In a further embodiment said polymersomes may comprise a combination of triblock copolymers of the hydrophile-hydrophobe-hydrophile type and diblock copolymers of the hydrophile-hydrophobe type.

The HF membrane of the invention has preferably a TFC layer formed through interfacial polymerization of an aqueous solution of an amine with a solution of an acid chloride in an organic solvent, and wherein the aquaporin water channel vesicles are incorporated in said aqueous solution.

In one embodiment of the method of preparing the HF module of the invention the fibers are gas purged to blow off excess water in step f) and the module is held upside down in step f).

In a further aspect of the present invention, a hollow fiber module having high water permeability and small pore sizes, such as having a pore diameter of less than about 5 to 10 nm, such as equal to or less than about 1 nm, is provided. Formation of a separation layer in the form of a thin film layer as known in the art onto the surface of a support membrane fiber results in changes to the water transport mechanism. Instead of water transport taking place by normal diffusion through the pores of the support membrane, another type of water transport takes place through the thin film layer as is known from this type of reverse osmosis membranes, where membrane permeability is limited. The nonporous nature of the thin film separating layer results in transport of water requiring "jump diffusion" as described in Kotelyanskii et al. 1998. Thus, thin film modification of water membranes have mainly found use in reverse osmosis, where a hydrostatic pressure is required to force the water through the membrane, and the obtained advantage lies in the improved separation of unwanted solutes in the water to be filtered. These conventional membranes for reverse osmosis have effectively 100-200 nm thick non-porous layers supported by a porous material. Water permeation in these membranes occurs as a diffusion process through the non-porous layer established via the appearance and disappearance of interstitial spaces. The HF module of the present invention may be further improved relative to the prior art reverse osmosis membranes by having aquaporin water channels incorporated in the thin film layer making it a thin film composite (TFC) layer. The incorporation of aquaporins have the added benefit of providing a selective water transport through its pores having a diameter of only 2.4 Å at its narrowest passage (AqpZ pore, cf. Wang et al. 2005) where an efficient single file water transport takes place. The HF module of the invention combines the advantages of having a thin film separation layer together with aquaporin water channels thus providing improved separation as well as water flux through Ångstrom sized pores making the HF module suitable for both reverse osmosis, forward osmosis, assisted forward osmosis, nanofiltration etc.

Definitions

The term "hollow fiber membrane" and "HF membrane" as used herein refers to any type of capillary membrane which can be used for liquid filtration purposes.

Figure 2:
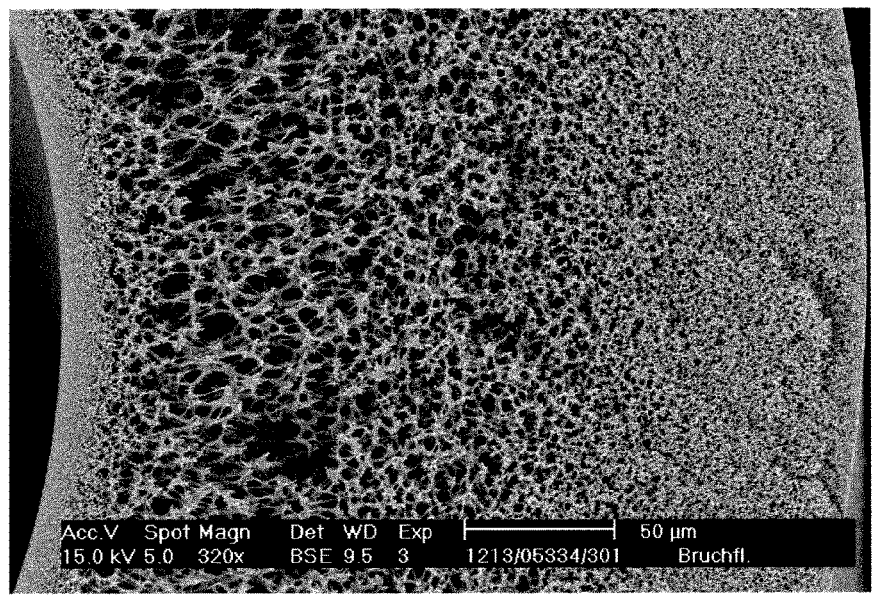
FIG. 2 shows as a photograph and a drawing a cross section of part of a hollow fiber, UltraPES™, having a wall thickness of about 220 μm±15 μm, an inner diameter of about 760 μm±30 μm, a molecular weight cut-off (MWCO, dextran, 90%, 0 bar) of 65 kD±20 kD, and a transmembrane water flow of ≥0.65 ml/[min×cm$^2$×bar] at 25° C. Picture obtained from Membrana GmbH.
Figure 2:
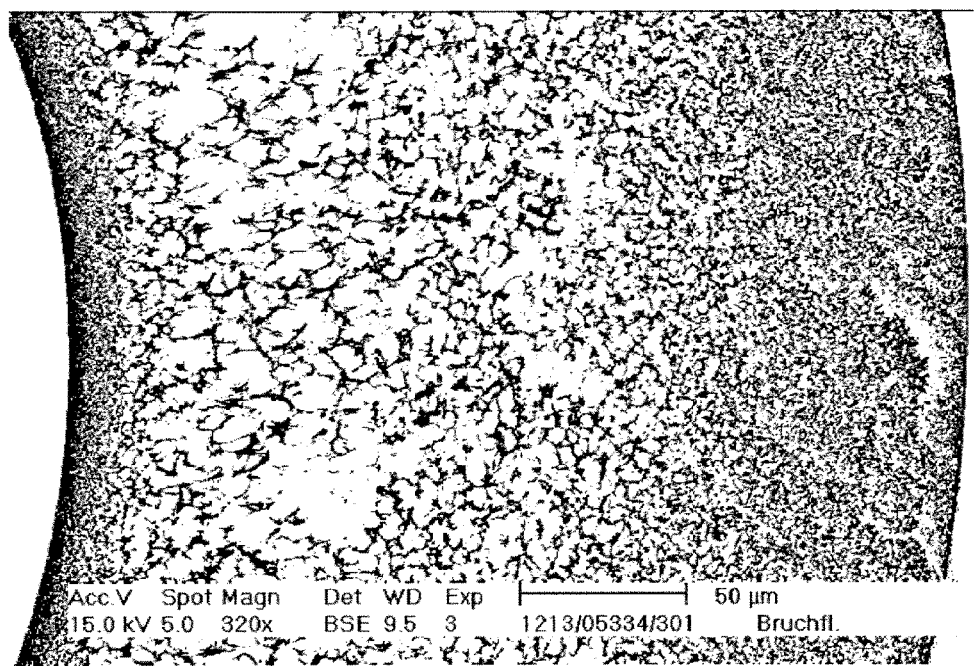

The term "polyethersulfone" as used herein refers to a membrane material used in the fabrication of hollow fiber modules. An example is the membrane material UltraPES™ marketed by Membrana GmbH. A cross section microscope photo of an UltraPes™ fiber is shown in FIG. 2, cf. Membrana GMBH.

"Aquaporin" as used herein refers to selective water channel proteins, including AqpZ and SoPIP2;1 prepared according to the methods described by Maria Karlsson et al. (FEBS Letters 537 (2003) 68-72) or as described in Jensen et al. US 2012/0080377 A1.

"Asolectin" as used herein refers to a soybean lecithin fraction [IV-S], which is a highly purified phospholipid product containing lecithin, cephalin, inositol phosphatides & soybean oil (synonym: azolectin).

"Block copolymer" as used herein refers to membrane forming or vesicle forming di- and tri-block copolymers having both hydrophilic (A or C) and hydrophobic (B) blocks; the diblock copolymers being of the A-B or C-B type which are able to form bilayers and the triblock copolymers being of the A-B-A or A-B-C type that form monolayers by self assembly, where all of the membranes have the hydrophobic layer in the middle.

Examples of useful diblock copolymers and examples of useful triblock copolymers are the following:

| Species | Supplier | Formula | $n_{(hydrophobic)}$ | $n_{(hydrophilic)}$ |
|---|---|---|---|---|
| P7258 | Polymer Source | $EO_{48}DMS_{70}$ | 70 | 48 |
| P5809 | Polymer Source | $EO_{15}BO_{16}$ | 15 | 16 |
| P8365 | Polymer Source | $EO_{25}DMS_{8}$ | 8 | 25 |
| P7259 | Polymer Source | $EO_{48}DMS_{14}$ | 14 | 48 |
| P7261 | Polymer Source | $EO_{114}DMS_{14}$ | 14 | 114 |
| P3691B | Polymer Source | $MOXA_{6}DMS_{35}MOXA_{6}$ | 35 | 12 |
| P8061 | Polymer Source | $MOXA_{15}DMS_{67}MOXA_{15}$ | 67 | 30 |
| P9548 | Polymer Source | $MOXA_{15}DMS_{119}MOXA_{15}$ | 119 | 30 | where EO-block-DMS-block, such as $EO_{25}DMS_{8}$, represents poly(dimethylsiloxane-block-ethylene oxide-block), EO-block-Bo-block, such as $EO_{15}BO_{16}$, represents poly(butylene oxide-block-ethylene oxide-block), and MOXA-block-DMS-block-MOXA-block, such as $MOXA_{6}DMS_{35}MOXA_{6}$, represents poly(2-methyloxazoline-block-dimethylsiloxane-block-2-methyloxazoline). The diblock and triblock copolymers can be used as single components or as mixtures in the creation of biomimetic membranes, such as vesicles or planar membranes, for incorporation of the aquaporins having amphiphilic properties due to their native transmembrane properties and functions.

"Liquid membrane" as used herein refers to membrane systems as disclosed in WO2010/146365 (Aquaporin A/S) and WO 2012/080946 (Aquaporin A/S). Said liquid membrane is an integral component of the TFC HF membranes of the invention wherein it is immobilized or encapsulated.

The term "assisted forward osmosis" (or "pressure assisted forward osmosis") as used herein refers to the concept of applying a mechanical pressure to the feed side of the membrane to enhance the water flux through synergising the osmotic and hydraulic driving forces.

"Thin-film-composite" or (TFC) Hollow Fiber Membranes as used herein are prepared using an amine reactant, preferably an aromatic amine, such as a diamine or triamine, e.g. 1,3-diaminobenzene (m-Phenylenediamine>99%, e. g. as purchased from Sigma-Aldrich) in an aqueous solution, and an acyl halide reactant, such as a di- or triacid chloride, preferably an aromatic acyl halide, e.g. benzene-1,3,5-tricarbonyl chloride (CAS No. 84270-84-8, trimesoyl chloride (TMC), 98%, e.g. as purchased from Sigma-Aldrich) dissolved in an organic solvent where said reactants combine in an interfacial polymerization reaction, cf. U.S. Pat. No. 4,277,344 which describes in detail the formation of a composite membrane comprising a polyamide laminated to a porous membrane support, at the surface of the support membrane, e.g. a polyethersulfone membrane. Benzene-1,3,5-tricarbonyl chloride is dissolved in a solvent, such as a C6-C12 hydrocarbon including hexane (>99.9%, Fisher Chemicals), heptane, octane, nonane, decane etc. (straight chain or branched hydrocarbons) or other low aromatic hydrocarbon solvent, e.g. Isopar™ G Fluid which is produced from petroleum-based raw materials treated with hydrogen in the presence of a catalyst to produce a low odour fluid the major components of which include isoalkanes. Isopar™ G Fluid: Chemical Name: Hydrocarbons, C10-C12, isoalkanes, <2% aromatics; CAS No: 64742-48-9, chemical name: Naphtha (petroleum), hydrotreated heavy (from ExxonMobil Chemical). Alternatives to the reactant 1,3-diaminobenzene include diamines such as hexamethylenediamine etc., and alternatives to the reactant benzene-1,3,5-tricarbonyl chloride include a diacyl chloride, adipoyl chloride etc. as known in the art.

"Gas" as used herein means any gaseous fluid, such as inert gases, dinitrogen, atmospheric air, etc. that can be used for blowing off the solvent.

Proteoliposomes as used herein typically have a lipid to protein ratio (LPR calculated on a mole basis) of between 25 to 500, such as about 100 to about 200.

Proteopolymersomes as used herein typically have a polymer to protein ratio (POPR calculated on a mole basis) of between 25 to 500, such as about 50 to about 100 when using a triblock copolymer and a polymer to protein ratio of between 25 to 500, such as about 100 to about 200 when using a diblock copolymer.

In a preferred embodiment of the invention the hollow fiber bundles comprise a polyethersulfone (UltraPES™) support material in the form of a hydrophilic capillary membrane material having the following characteristics (mean values are given):

Physical characteristics: Wall thickness 220 µm±15 µm; inner diameter 760 µm±30 µm; tensile strength ≥410 cN; elongation at break ≥40%; explosion pressure ≥12 bar; implosion pressure ≥7 bar; Minimal pore size of 6-7 nm.

Membrane performance characteristics: Transmembrane flow (water, 25° C.) ≥0.65 ml/[min×cm²×bar]; molecular weight cut off MWCO (dextran, 90%, 0 bar) 65 kD±20 kD.

The characteristics given are representative of a preferred UltraPES material provided by Membrana GmbH, Oehder Straße 28, D-42289 Wuppertal, Germany.

In another preferred embodiment of the invention the hollow fibre bundles comprise the polyethersulfone MicroPES®, such as the TF1.0 version also provided by Membrana GmbH, support material, which differs from the UltraPES material in having a Transmembrane flow (water, 25° C.) ≥35 ml/[min×cm²×bar]; wall thickness of 100 µm±25 µm; an inner diameter of 300 µm±40 µm; tensile strength of ≥50 cN; elongation at break ≥30%; maximum pore size of 0.5 µm±0.1 µm.

EXPERIMENTAL EXAMPLES

Preparation of 1 mg/mL Asolectin Proteoliposomes, and Lipid to Protein Ratio (LPR) 200 Using AqpZ Mw 27233 According to the Following Protocol 1) Fill a 50 mL glass evaporation vial with 5 mL of a 2 mg/mL stock solution of asolectin (mW 786.11 g/mol, Sigma) in CHCl$_3$.
2) Evaporate the CHCl$_3$ using a rotation evaporator for at least 2 h to complete dryness.
3) Add 0.8 mL of buffer solution (1.3% octylglucoside (OG) in PBS pH 7.4) to rehydrate the film obtained in the evaporation vial in step 2.
4) Shake the vial at maximum rpm on a platform shaker (Heidolph orbital platform shaker Unimax 2010 or equivalent) until the lipid is dissolved.
5) Add 1.73 mg of AqpZ in a protein buffer containing Tris pH8, glucose and OG, 10 mg/mL, and rotate vial for 15 min at 200 rpm, the AqpZ being prepared according to description herein.
6) Slowly add 9.03 ml PBS (pH 7.4 without OG), and shake vial for 15 min at 200 rpm.
7) Freeze/thaw the combined solution/suspension on dry ice/40° C. water bath for three times to eliminate possible multilamellar structures.
8) Add 250 mg of hydrated Biobeads (SM2 from BioRad) and rotate vial for 1 h at 200 rpm at 4° C. to adsorb detergent (OG).
9) Add further 250 mg of hydrated Biobeads and rotate vial for 2 to 3 days at 200 rpm at 4° C.
10) The Biobeads with adsorbed OG are then removed by pipetting off the suspension.
11) Extrude the obtained suspension for about 11 times through a 200 nm polycarbonate filter using an extruder (such as an EmulsiFlex-05 from Avestin, Canada) at least 1 time and up to about 22 times to obtain a uniform proteoliposome suspension (vesicles) suspension.

Protocol for 1 mg/ml Proteo-Polymersomes, Protein to Polymer Ratio (POPR) 50

Polyoxazoline Based Triblock Copolymers, Poly(2-methyl oxazoline-b-dimethyl siloxane-b-2-methyl oxazoline, Moxa 12: DMS 35, Mw 3510) (P3691 purchased from Polymer Source™, Quebec, Canada), AqpZ Mw 27233
1) Fill a 50 ml glass evaporation vial with 5 ml of a 2 mg/ml stock solution of P3691 in CHCl$_3$.
2) Evaporate the CHCl$_3$ using a rotation evaporator for at least 2 h to complete dryness.
3) Add 3.0 mL of buffer solution (1.3% O.G.; 200 mM Sucrose; 10 mM Tris pH 8; 50 mM NaCl) to rehydrate the film obtained in the evaporation vial in step 2.
4) Shake the vial at 200 rpm on a platform shaker (Heidolph orbital platform shaker Unimax 2010 or equivalent) for 3 hours to obtain dissolution of the copolymer.

5) Add 1.55 mg µL of AqpZ in a protein buffer containing Tris, glucose and OG, and rotate vial over night at 200 rpm and 4° C.
6) Add 6.88 ml buffer (10 mM Tris pH 8; 50 mM NaCl) slowly while mixing up and down with pipette.
7) Add 180 mg hydrated Biobeads and rotate for 1 h at 200 rpm.
8) Add 210 mg hydrated Biobeads and rotate for 1 h at 200 rpm.
9) Add 240 mg hydrated Biobeads and rotate O.N. at 200 rpm 4° C.
10) Add 240 mg hydrated Biobeads and rotate O.N. at 200 rpm 4° C.
11) The Biobeads with adsorbed OG are then removed by pipetting off the suspension.
12) Extrude the suspension for about 21 times through a 200 nm polycarbonate filter using an extruder, such as from at least 1 time and up to about 22 times to obtain a uniform proteopolymersome suspension (vesicles) suspension.

Example 1. Preparation of a Hollow Fiber Module Wherein the Inside Surface of the Fibres has been Functionalised with Immobilised AqpZ Vesicles Using a hollow fiber module having polyethersulfone membranes, such as a custom-made module, such as having 9 fibers corresponding to about 10 cm$^2$ outside area and 5 cm$^2$ inside area, or such as having a membrane area of up to 0.5 m$^2$ which may correspond to several hundred fibers depending on module length (Membrana GmbH, Wuppertal, Germany), the module being prepared essentially as described by Sukitpaneenit et al. 2011, a thin film composite layer is prepared on the inside fiber surface through interfacial polymerization involving the following steps:
1) Obtaining 4 mL of AqpZ vesicles as prepared in the example above.
2) Dissolve 250 mg of 1,3-diaminobenzene in 6 mL of MilliQ water to obtain a solution of 4.2% (w/w) concentration.
3) 75 mg of benzene-1,3,5-tricarbonyl chloride is dissolved in 50 mL of hexane to obtain a final concentration of 0.15% (w/v)
4) A 1,3-diaminobenzene/AqpZ vesicle mixture is prepared by dissolving/mixing 4 mL of the vesicles preparation from step 1 with 6 mL of the solution from step 2.
5) The mixture obtained in step 4 is constantly pumped through the module for 2 minutes using end inlet 1 (or inlet 2), cf. FIG. 1.
6) Excess 1,3-diaminobenzene is removed by a constant air purging of the lumen side of the fibers for 2 minutes using, e.g., inlet 1, cf. FIG. 1, preferably holding the module upside down.
7) A constant flow of the benzene-1,3,5-tricarbonyl chloride solution from step 3 is then injected into the module through inlet 1 for approximately 30 s using a syringe pump, e.g. from TSE systems, cf. [retrieved on 2012-11-09 from the Internet: (<URL: http://www.tse-systems.com/products/other-products/pumps-infusion/index.htm)] to allow the interfacial polymerization reaction to take place.
8) Finally, the module is preferably rinsed with MilliQ water, approximately 10 mL are used, by injection through side inlet 3 and 4.
After filling it with water the module is sealed with the white sealing caps (5), cf. FIG. 1, to prevent it from drying out (the sealing caps are part of the module and it is delivered with them).

Alternatively, steps 2 and 3 are as described below where all other steps are the same as shown above:
2) Dissolve 1,3-diaminobenzene in MilliQ water to obtain a solution of 4.2% (w/w) concentration.
3) benzene-1,3,5-tricarbonyl chloride is dissolved in a solvent such as hexane or isoalkane hydrocarbon solvent to obtain a final concentration of 0.15% (w/v).

Example 2. Preparation of a Hollow Fiber Module Wherein the Inside Surface of the Fibres has been Functionalised with Immobilised AqpZ Vesicles Using the same hollow fiber module as in Example 1 a thin film composite layer is prepared on the inside fiber surface through interfacial polymerization involving the following steps:
1) Obtaining 4 mL of AqpZ vesicles as prepared in the example above.
2) Dissolve 250 mg of 1,3-diaminobenzene in 6 mL of MilliQ water to obtain a solution of 4.2% (w/w) concentration.
3) 75 mg of benzene-1,3,5-tricarbonyl chloride is dissolved in 50 mL of hexane to obtain a final concentration of 0.15% (w/v)
4) A 1,3-diaminobenzene/AqpZ vesicle mixture is prepared by dissolving/mixing 4 mL of the vesicles preparation from step 1 with 6 mL of the solution from step 2.
5) The mixture obtained in step 4 is constantly pumped through the module for 2 minutes using end inlet 1 (or inlet 2), cf. FIG. 1.
6) Excess 1,3-diaminobenzene is removed from the module by a constant stream of an organic fluid such as hexane for 1 min through inlet 1 using a syringe pump.
7) A constant flow of the benzene-1,3,5-tricarbonyl chloride solution from step 3 is then injected into the module through inlet 1 for approximately 30 s using a syringe pump, e.g. from TSE systems, cf. [retrieved on 2012-11-09 from the Internet: (<URL: http://www.tse-systems.com/products/other-products/pumps-infusion/index.htm)] to allow the interfacial polymerization reaction to take place.
8) Finally, the module is preferably rinsed with MilliQ water, approximately 10 mL are used, by injection through side inlet 1 and 3.
After filling it with water the module is sealed with the white sealing caps (5), cf. FIG. 1, to prevent it from drying out (the sealing caps are part of the module and it is delivered with them).
Alternatively, steps 2 and 3 are as described below where all other steps are the same as shown above:
2) Dissolve 1,3-diaminobenzene in MilliQ water to obtain a solution of 4.2% (w/w) concentration.
3) benzene-1,3,5-tricarbonyl chloride is dissolved in a solvent such as hexane or isoalkane hydrocarbon solvent to obtain a final concentration of 0.15% (w/v).

Example 3. Preparation of a Hollow Fiber Module Wherein the Inside Surface of the Fibres has been Functionalised with Immobilised AqpZ Vesicles Using the same hollow fiber module as in Example 1 a thin film composite layer is prepared on the inside fiber surface through interfacial polymerization involving the following steps and using a syringe pump to push solutions through the module:
1) Obtaining 4 mL of AqpZ vesicles as prepared in the example above.

2) Dissolve 250 mg of 1,3-diaminobenzene in 6 mL of MilliQ water to obtain a solution of 4.2% (w/w) concentration.
3) 75 mg of benzene-1,3,5-tricarbonyl chloride is dissolved in 50 mL of hexane to obtain a final concentration of 0.15% (w/v).
4) A 1,3-diaminobenzene/AqpZ vesicle mixture is prepared by dissolving/mixing 4 mL of the vesicles preparation from step 1 with 6 mL of the solution from step 2.
5) Add the solution from step 2 through the inside of the fibers while holding the module vertically with inlet down making sure that the air is let out); the solution can preferably be pumped using a flow rate of about 5 mL/min and continue pumping the solution through for 2 min, e. g. such as starting timing immediately after the solution could be seen in upper end of module.
6) Disconnect the module from the syringe pump and turn it around to have excess solution flow out into collection glass.
7) Connect the module upside down to air and slowly start air flow until 10 L/min is reached; let air flow for 2 min
8) Connect the module to a benzene-1,3,5-tricarbonyl chloride solution syringe, hold the module in vertical position and start benzene-1,3,5-tricarbonyl chloride/hexane flow. e.g. while keeping a flow rate of about 15 mL/min.
9) Disconnect module from hexane syringe and turn upside down to get last hexane out; connect to air and purge at about 10 L/min for 5-10 s.
10) Fill module with MilliQ by sucking it in from a glass container.

Alternatively, steps 2 and 3 are as described below where all other steps are the same as shown above:
2) Dissolve 1,3-diaminobenzene in MilliQ water to obtain a solution of 4.2% (w/w) concentration.
3) Benzene-1,3,5-tricarbonyl chloride is dissolved in a solvent such as hexane or isoalkane hydrocarbon solvent to obtain a final concentration of 0.15% (w/v).

Figure 3:
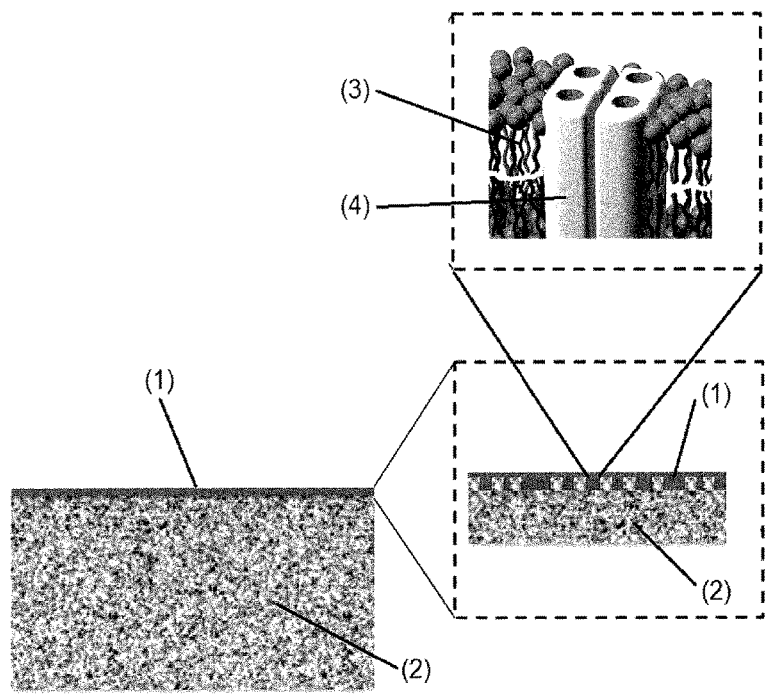
FIG. 3 shows a principle sketch of the microstructure of the thin film composite layer formed on a hollow fiber of the invention, cf. Example 1 below.

Alternatively, in the pHF22 protocol we use a syringe pump to push solutions through the module, such as a MicroPES-TF10 HF module, then after obtaining 4 mL of AqpZ vesicles as prepared in the example above, follow the steps below:
1) Dissolve MPD in MilliQ water and add the AqpZ vesicles to get a 2.5% (W/W) concentration of MPD in water/vesicle solution
2) Dissolve TMC in an organic solvent, such as hexane or an isoalkane hydrocarbon solvent, to a final concentration of 0.15% W/V
3) push MPD solution through the inside of the fibers while holding it vertically with inlet down (while filling the module repeatedly shake it to get the air out); 5 mL/min flow rate
4) continue pushing MPD solution through for 1 min (time starts after MPD solution could be seen in upper end of module) and then let it soak with MPD solution inside for 1 min
5) disconnect module from syringe and turn it around to have excess MPD flow out into collection glass
6) connect the module upside down (meaning end with number on top) to air and slowly start air flow; dry with controlled air stream for 1 to 2 min and turn module in between
7) connect to TMC solution, hold vertical (numbered end on bottom) and start TMC solution flow (flowrate: 10 mL/min)
8) let solution run through the fibers for 45 s (after the module is filled, it can be tilted back to horizontal position)
9) disconnect module from syringe and turn upside down to get last TMC solution out; connect to air and purge at 10 L/min for 5-10 s
10) fill module with MilliQ by sucking it in from a glass Following the various methods outlined above a TFC-aquaporin modified hollow fiber module is obtained where the inner surface of the fibers have acquired a novel microstructure as shown in FIG. 3, where (1) refers to the TFC layer ~200 nm and (2) refers to the support membrane of 220 µm, (1) and (2) together represents a cross section of the hollow fiber wall; (3) schematically represents the bilayer membrane in the case of lipids and diblock copolymers as amphiphilic membrane forming materials having hydrophilic head groups and hydrophobic tail groups. Feature (3) would show a monolayer having a hydrophobic middle portion and hydrophilic end portions or would show a type of bilayer where the triblock copolymers assume a horseshoe conformation or mixtures of both when triblock copolymers are used for the amphiphilic membrane material. (4) Represents the aquaporin protein where its tetrameric form is shown. However, the protein may also be present as a monomer or as a dimer, both of which are also water channels.

Filtration Results Using Forward Osmosis

Tables 1 and 2 below show filtration results in the form of measured water flux, Jw, and measured reverse salt flux, Js, for HF modules prepared according to the invention using a feed solution of 10 µM calcein (CAS No. 1461-15-0, Mw 622.55) and a draw solution of 2 M NaCl both in deionized water (MilliQ water) and where the TFC-aquaporin layer is formed on the inside of hollow fibers (lumen) and the draw solution is applied to the outside or inside of the fibers. Co-current or counter-current flow was used. Referring to FIG. 1: Typically, feed solution was pumped through inlet (1) and out through (2), and draw solution was pumped through inlet (3) and out through (4). In five experiments a counter-current flow was used, cf. Tables 1 and 2 and description below. The water channel protein AqpZ was used in all experiments, and both a lipid (asolectin) and various block copolymers (P3691, P8061) were vesicle membrane materials.

Each experiment is characterised by the water flux (Jw), the reverse salt flux (Js) and the calcein rejection. The water flux describes how much water is transported over a certain amount of membrane area in a given time (usually L/m2 h) and is measured by monitoring the weight loss in the feed solution. The reverse salt flux characterises the amount of draw solute that diffuses back into the feed solution. It is an indicator on how salt-tight a membrane is. The Js is determined by measuring the conductivity changes in the feed solution. The calcein rejection is used to determine the forward rejection properties of a membrane. Here, a fluorescent marker, that is easily detectable by a desktop fluorometer (e.g. Qubit fluorometer, Invitrogen), is added to the feed solution. By measuring its concentration in draw we can determine how much of the marker is rejected.

Water flux is calculated as following:

$$Jw = Vt/(A*t); [L/m2h],$$

where Vt is the transported Volume, A the active membrane area and t the time in hours. To determine the reverse salt flux we have to measure the conductivity in the feed solution. With the help of a calibration curve we can then relate the conductivity to a salt concentration and thus calculate the reverse salt flux as follows:

$$Js = (cf,\text{end}*Vf,\text{end} - cf,\text{start}*Vf,\text{start})/(A*t); [g/m2h],$$

where Vf marks the start and end volume and cf the start and end concentration of salt in feed.

The calcein rejection is approximated by:

$$Rca = 1 - ((Vd,\text{end}*cca,d,\text{end} - Vd,\text{start}*cca,d,\text{start})/(Vt*cca,f,\text{start}))$$

Where Vd is the start and end draw volume and cca,d the calcein reads in the draw solution. The starting concentration of calcein in feed (cca,f) is taken as a constant. This is an approximation because a membrane that rejects calcein will up-concentrate the calcein concentration in feed. However, this can be tolerated because by leaving the start concentration constant in the calculation we underestimate the total rejection, which is acceptable.

TABLE 1

| HF module No. | Flow speed [mL/min] | $J_w$ Water Flux [L/m²h] | $J_s$ Reverse salt flux [g/m²h] | $J_s/J_w$ [g/L] | Calcein Rejection [%] | Run time |
|---|---|---|---|---|---|---|
| 12-0644 (Thin film layer only) | feed = 10 draw = 50; a | 14.07 | 1.67 | 0.12 | 99.97 | ≤3 h |
| 12-0636 Asolectin d | feed = 10 draw = 50; a | 14.66 | 5.30 | 0.36 | 99.98 | 360 min |
| 12-0636 Asolectin d | feed = 10 draw = 50, a | 21.88 | 4.77 | 0.22 | 99.97 | 360 min |
| 12-0630 P3691 d | feed = 50 draw = 10; ab | 17.06 | 5.17 | 0.30 | 99.89 | 380 min |

Notes:
a counter-current flow;
ab draw on inside & counter-current flow;
d according to Ex. 1. HF module No. 12-0644 has been modified with thin film layer only without vesicles and/or protein and thus represents prior art as disclosed by Sukitpaneenit & Chung 2012.

Table 1 clearly shows that when using the HF module of the invention it is possible to obtain a greater water flux, Jw, of up to 3 L/m² h above the flux obtainable for a thin film modified HF module having 9 fibers while still maintaining a good Js/Jw ratio of as low as about 0.22. This will be an advantage for filtration purposes, where a high water flux is desirable while less efficient salt retention can be tolerated, e.g. in the treatment of wastewater. The results according to the invention shown in Table 1 are all obtained using counter-current flow, which could prove an advantage for high water flux.

maintaining a good water flux of about 8 to 9 L/m² h. These results are obtained using co-current flow with the draw solution on the inside of the HF module fibers. All of the above calcein rejection values are better than 99% showing that the HF modules used are extremely tight (no membrane leakage). The HF module of the invention can be used with both co-current flow and counter-current flow, and as seen in the results above it can be preferred to have counter-current flow. In that case the differences in osmotic pressure are more evenly distributed over the whole length of the fiber. When both feed and draw solutions enter at the same side (co-current flow), then water is immediately pulled out of the feed stream into the draw stream, and along the fiber the difference in osmotic pressure will decrease rapidly (feed is concentrated and draw diluted). When the HF module is now operated with counter-current flow, then we have a cleaner feed meeting a diluted draw in one end and a high osmotic draw meeting a weakly osmotic feed (salt contaminated) at the other end. So the osmotic pressure difference between both liquids is closer to being the same along the length of the fiber.

TABLE 2

| HF module No. | Flow speed [mL/min] | $J_w$ Water Flux [L/m²h] | $J_s$ Reverse salt flux [g/m²h] | $J_s/J_w$ [g/L] | Calcein Rejection [%] | Run time |
|---|---|---|---|---|---|---|
| 12-0644 (thin film layer only) | feed = 10 draw = 50; a | 14.07 | 1.67 | 0.12 | 99.97 | ≤3 h |
| 12-1470 P8061 dd | feed = 50 draw = 10; c | 8.72 | 1.17 | 0.13 | 99.01 | 900 min |
| 12-1474 P8061 dd | feed = 50 draw = 10; c | 7.71 | 1.44 | 0.19 | 99.27 | 900 min |

Notes:
a counter-current flow;
c draw on inside; dd prepared according to Ex. 3. HF module No. 12-0644 has been modified with thin film layer only without vesicles and/or protein and thus represents prior art as disclosed by Sukitpaneenit & Chung 2012.

Table 2 clearly shows that using the HF module of the invention it is possible to obtain an increase in reverse salt retention, Js, of about 0.5 g/m² h corresponding to a 25% increase compared to the reverse salt retention obtainable for a thin film modified HF module having 9 fibers while still This might favour counter-current flow. However, what speaks in favour of co-current flow is that the pressure which is generated by pumping inside is met with an equal pressure that is generated by pumping on the outside of the fiber.

TABLE 3 showing results from 4 runs using the alternative method described above (PHF22)

| Protocol | $J_w$ Water flux [L/m²h] | $J_s$ Reverse salt flux [g/m²h] | $J_s/J_w$ [g/L] | Calcein Rejection [%] |
|---|---|---|---|---|
| pHF22 | 4.04 | 0.75 | 0.19 | 99.98 |
| MicroPES-TF10 fibers | 4.52 | 1.02 | 0.23 | 99.88 |
| Experiment run for 3.5 hours | 4.61 | 0.86 | 0.19 | 99.88 |
|  | 8.1 | 1.3 | 0.16 | 99.94 |
| Average | 5.32 | 0.98 | 0.19 | 99.92 |

TABLE 4 showing results from 4 runs using the alternative method described above (PHF22)

| Protocol | $J_w$ Water flux [L/m²h] | $J_s$ Reverse salt flux [g/m²h] | $J_s/J_w$ [g/L] | Calcein Rejection [%] |
|---|---|---|---|---|
| pHF22 | 12.2 | 2.06 | 0.17 | 99.95 |
| μPES-TF10 fibers | 13.62 | 2.41 | 0.18 | 99.97 |
| Experiment run for 3.5 hours | 16.48 | 2.5 | 0.15 | 99.98 |
|  | 17.34 | 2.55 | 0.15 | 99.77 |
| Average | 14.91 | 2.38 | 0.16 | 99.92 |

TABLE 5 showing results from 4 runs using the alternative method described above (PHF22)

| Protocol | $J_w$ Water Flux [L/m²h] | $J_s$ Reverse salt flux [g/m²h] | $J_s/J_w$ [g/L] | Calcein Rejection [%] |
|---|---|---|---|---|
| pHF22 (slower pumping speed for TMC solution (5 mL/min instead of 10 mL/min)) | 16.12 | 3.6 | 0.22 | 99.98 |
|  | 16.7 | 3.44 | 0.21 | 99.96 |
|  | 9.56 | 1.69 | 0.18 | 99.69 |
| Flow speed [mL/min]: feed = 10 draw = 50 | 9.58 | 2.15 | 0.22 | 99.99 |
| Experiment run for 200 mins |  |  |  |  |
| Average | 12.99 | 2.72 | 0.21 | 99.91 |

The inside coating of HF MicroPES TF10 5 cm² active membrane area hollow fibre modules resulted in high reproducibility; All experiments in Tables 3 and 4 have comparable Js/Jw ratios with varying Jw and Js which can be due to differences/tolerances in experiments, differences in measuring accuracy, and possibly due to the fact that the coating was a hand-made process. Thus, the two different experiments resulted in HF modules having comparable Js/Jw but varying average ranges of Jw and Js, cf. Table 3 showing experimental results of moderate Jw and low Js, and Table 4 showing experimental results of high Jw and moderate Js.

Example 4. Preparation of a Hollow Fiber Module Wherein the Outside Surface of the Fibres has been Functionalised with Immobilised AqpZ Vesicles Using a hollow fiber module having polyethersulfone membranes, such as a custom-made module, such as having 9 fibers corresponding to about 10 cm², or such as having a membrane area of up to 0.5 m² which may correspond to several hundred fibers depending on module length (Membrana GmbH, Wuppertal, Germany), a thin film composite layer being prepared on the outside fiber surface through interfacial polymerization involving the following steps of protocol PHF21:

1) Obtain 4 mL of AqpZ vesicles as prepared in the example above.
2) Dissolve 1,3-diaminobenzene in MilliQ water to obtain a solution of 4.2% (w/w) concentration.
3) benzene-1,3,5-tricarbonyl chloride is dissolved in an organic solvent, such as hexane or an isoalkane hydrocarbon solvent, to obtain a final concentration of 0.15% (w/v)
4) A 1,3-diaminobenzene/AqpZ vesicle mixture is prepared by dissolving/mixing 4 mL of the vesicles preparation from step 1 with 6 mL of the solution from step 2.
5) fill solution from step 4. into the module on the outside of the fibers (side inlets of the module); flowrate: 5 mL/min
6) stop flow after 1 min and leave fibers soaking for 1 min
7) empty the module and purge with air to get leftover MPD solution out
8) use air flow to remove surface water from the fibers (air flow rate 25 L/min)
9) pump solution from step 3. into the module using a flow rate of 15 mL/min
10) after module is filled continue pumping for 30 s
11) disconnect module from syringe and turn upside down to get last solution out; connect to air and purge at 10 L/min for 5-10 s
12) fill module with MilliQ by sucking it in from a glass

TABLE 5 showing results from 4 runs using the method described above (PHF21)

| Protocol PHF21 according to Ex. 4 | $J_w$ Water flux [L/m²h] | $J_s$ Reverse salt flux [g/m²h] | $J_s/J_w$ [g/L] | Calcein Rejection [%] |
|---|---|---|---|---|
| UltraPES fibers Outside coating (20 L/min) Experiment run for 900 min | 6.36 | 2.09 | 0.33 | 99.66 |
|  | 6.63 | 1.1 | 0.17 | 99.96 |
| UltraPES fibers Outside coating (25 L/min) Experiment run for 900 min | 8.57 | 3.95 | 0.46 | 99.57 |
|  | 8.14 | 3.97 | 0.49 | 99.72 |
| Average | 7.43 | 2.78 | 0.36 | 99.73 |

The outside coating of HF UltraPES TF10 5 cm² active membrane area hollow fibre modules resulted in high reproducibility: The experiments in Table 5 show sets of 2 (roughly 2×8 [L/m² h] and 2×6 [L/m² h]) that have comparable Jw and Js values.

Example 5. Inside Coating for Creation of TFC Layer on Fibres in MicroPES TF10 HF Module Protocol HF24 for the inside coating of 100 cm² modules using a syringe pump to suck solutions through the module:
Use a syringe pump to pump solutions through the module
1) pre-soak modules with MilliQ at least over night
2) Obtain 16 mL of AqpZ vesicles as prepared in the example above.
3) Dissolve 1,3-diaminobenzene in MilliQ water to obtain a solution of 4.2% (w/w) concentration.
4) 75 mg of benzene-1,3,5-tricarbonyl chloride are dissolved in 50 mL of hexane to obtain a final concentration of 0.15% (w/v)
5) A 1,3-diaminobenzene/AqpZ vesicle mixture is prepared by dissolving/mixing 16 mL of the vesicles preparation from step 1 with 24 mL of the solution from step 3.
6) pump solution from step 5. through the module for as long as it takes until no more bubbles come out (tap it continuously to shake bubbles out) at 10 mL/min; keep the module vertically 7) Let solution soak in fibers for 1 min
8) disconnect module from syringe and let excess solution flow out into collection glass
9) connect the module upside down to air and slowly start air flow until 20 L/min are reached
10) dry with controlled air stream for 3 to 5 min and turn module in between
11) push solution from step 4. through the fibers at a constant flow (flowrate: 15 mL/min) for 45 s (starting from when TMC enters the fibers)
12) empty the module by disconnecting the tube
13) blow air through the fibers for 5 to 10 s to eject leftover solution
14) fill fibers and module with MilliQ

TABLE 6 showing results from 2 runs using the method described above (PHF24)

| Protocol | $J_w$ Water flux [L/m²h] | $J_s$ Reverse salt flux [g/m²h] | $J_s/J_w$ [g/L] | Calcein Rejection [%] |
|---|---|---|---|---|
| pHF24; MicroPES-TF10 fibers; 2M NaCl as draw Experiments run for 200 min | 10.83 14.21 | 1.21 1.65 | 0.11 0.12 | 99.73 99.88 |
| Average | 12.52 | 1.43 | 0.11 | 99.81 |

TABLE 7 showing results from 3 runs using the method described above (PHF24)

| Protocol | $J_w$ Water flux [L/m²h] | $J_s$ Reverse salt flux [g/m²h] | $J_s/J_w$ [g/L] | Calcein Rejection [%] |
|---|---|---|---|---|
| pHF24; MicroPES-TF10 fibers; 1M NaCl as draw Experiments run for 200 min | 8.26 7.66 6.01 | 1.33 1.72 1 | 0.16 0.22 0.17 | 99.97 99.96 99.74 |
| Average | 7.31 | 1.35 | 0.18 | 99.89 |

The inside coating of HF MicroPES TF10 100 cm² active membrane area hollow fibre modules resulted in high reproducibility, cf. Tables 6 and 7 showing experimental results with 2M NaCl as draw solution and Table 6 showing experimental results with 1M NaCl draw solution where a reduction in water flux is notable in contrast to a minor reduction in reverse salt flux Example 6. Hollow Fibers Outside Continuous Coating Tests Purpose of this experiment is to establish a method of continuous coating on the outside of hollow fiber membranes via an automatized production process.

Materials

The machine and fibers are provided by Membrana and the coating chemicals and AqpZ vesicles are the same as used in the previous examples. The different hollow fiber membranes tested are MicroPES® TF10 and the DuraPES® 0.7 (Membrana GmbH, Wupperthal, Germany). Thus, the final coating holds an immobilized liquid membrane component containing aquaporin proteins.

Methods

Figure 4:
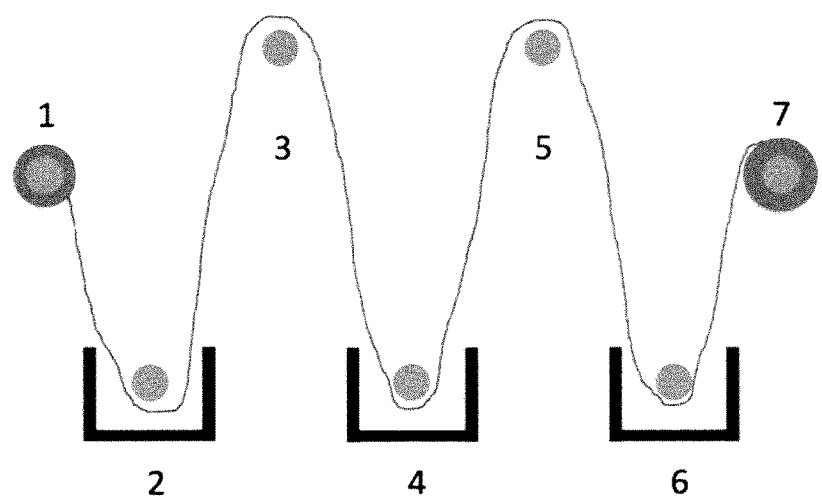
FIG. 4 shows a principle sketch of a process for automatized continuous outside coating of hollow fibers.

FIG. 4 illustrates in the form of a sketch the automatized continuous outside coating of hollow fibers (shown as a narrow line). In the figure: (1) is a coil of uncoated hollow fibers, preferably of a porous polyethersulfone (or polysulfone and the like) material.

From here they are transported into the aquaporin liquid membrane/MPD bath (2) where the aquaporin vesicles will soak into the fiber and attach to its surface. Excess MPD/aquaporin solution is removed during a drying step (3) where an air knife can be used to enhance excess solution removal. From here the fiber passes into the TMC/isoalkane hydrocarbon solvent bath where the interfacial polymerization takes place (4). Thus the aquaporin vesicles (proteopolymersomes of the liquid membrane) are encapsulated due to the TFC layer formed on the fiber. A drying step (5) ensures that all of the organic solution is evaporated before dipping the fiber into a water bath to remove left-over chemicals (6). Now the fiber is wound up on a new coil. The coated hollow fibers are then cut to the appropriate length and built into modules suitable for FO water extraction and separation purposes.

Example 7. Hollow Fiber Module Retention and Up-Concentration Assay of Two Small Peptides In this example we used HF modules having 5 cm² active area prepared according to Example 3 above.
Peptide A: GGG SGA GKT MW 0.692 kDa
100 mL of GGG SGA GKT peptide (MW 0.692 kDa) in TES buffer (feed solution) was filtered through a forward osmosis HF module until desired up-concentration (approximately 20×) using 1M NaCl as draw solution. The weight of the up-concentrated sample was measured to determine the volume reduction from the initial start sample. 10 µl of the up-concentrated sample was mixed with 90 µl of 10×TES buffer to eliminate the up-concentration factor of the buffer when determining the end concentration of the up-concentrated peptide sample. The total sample of 100 µl was then mixed with 100 µl of LavaPep quantification kit, incubated for 1 h in room temperature and then the fluorescence counts were read in a QuBit fluorometer (Invitrogen). The fluorescence counts were then compared to a standard curve where the actual concentration of the peptide sample was determined. From the same initial up-concentrated peptide sample, three samples (n=3) were prepared and measured in the Qubit and the mean fluorescent count number was used to determine the concentration from the standard curves. The sample volume was concentrated about 20 times, and the peptide A was up-concentrated about 18 to 19 times.
Peptide B: AGKT MW 0.375 kDa (Experimental Conditions Closely Corresponding to Those Described Above for Peptide A).
100 mL of AGKT peptide (MW 0.375 kDa) in TES buffer was run until desired up-concentration (approximately 20×) with the FO hollow fiber module. The mass of the up-concentrated sample was measured to determine the volume reduction from the initial start sample. The up-concentrated sample was then diluted 4 times with TES buffer to generate a 5 times up-concentrated peptide sample prior to further sample processing. This is done to avoid the quenching of the fluorescent signal for the smaller peptide as it has been observed in previous assays. 10 µl of the 5× up-concentrated sample was mixed with 90 µl of 10×TES buffer to eliminate the up-concentration factor of the buffer when determining the end concentration of the up-concentrated peptide sample. The total sample of 100 µl was then mixed with 100 µl of LavaPep quantification kit, incubated for 1 h in room temperature and then the fluorescence counts were read in a QuBit fluorometer (Invitrogen). The fluorescence counts were then compared to a standard curve where the actual concentration of the peptide sample was determined. From the same initial up-concentrated peptide sample, three samples (n=3) were prepared and measured in the Qubit and the mean fluorescent count number was used to determine the concentration from the standard curves. The sample volume was concentrated about 21 times, and the peptide B was up-concentrated about 24 times.

In both cases the up-concentration factor of the sample peptides A and B corresponds to the reduction factor of the volume, thus leading to the conclusion that the Hollow Fiber modules having an active aquaporin-TFC layer on the inside can be used to up-concentrate biomolecules at least down to sizes of 0.375 kDa.

Materials and Equipment:
Peptides: GGG SGA GKT purchased from CASLO
TES: N-(Tris(hydroxymethyl)methyl)-2-aminomethanesulfonic acid), Sigma Aldrich, Cas 7365-44-8
LavaPep peptide quantification kit: Purchased from www.lavapep.com
Part A (LP-022010)
Part B (LP-022010)
Qubit fluorometer, Invitrogen
Catalog number: Q32857
Serial number: 45257-233
Measurement setting: Quant-iT ssDNA
TES buffer, 100 mL
m (TES)=229.8 mg
m(EDTA)=37.2 mg
Adjust pH with 1M NaOH to 8 and fill up with mQ water.
Filter through a vacuum filter.
For 10×TES buffer the TES and EDTA amounts are multiplicated by 10.
LavaPep quantification kit.
Part A, Part B and mQ water are mixed together following the ratio (1:1:8).
Lavapep working solution is mixed with the up-concentrated peptide sample following the ratio (1:1).

8. Hollow Fiber Module Retention of Creatinine

In this example we will, i.a., use HF modules having 5 cm$^2$ active area prepared according to Example 3 above. The purpose is to determine the retention rate of creatinine (MW 113.12 g mol$^{-1}$), which occurs naturally in blood and urine. If the filtration in the kidney is deficient, creatinine blood levels will rise. The creatinine level in blood and urine is commonly used to calculate the creatinine clearance (CrCl), which correlates with the glomerular filtration rate (GFR) which is clinically important as a measurement of renal function.

Creatinine Assay

Creatinine in a sample is detected with the Creatinine Assay kit from abcam (ab65340). In the assay creatinine is converted to creatine by creatinase, creatine is converted to sarcosine which reacts with a probe to generate red color (lambda max=570 nm) and fluorescence (Ex/Em=538/587 nm).

The instructions of the kit are followed without alterations. Creatininase, creatinase and creatine enzyme mix are reconstituted with 220 µl of Assay Buffer each and aliquoted prior to use to avoid freeze and thaw cycles. Creatinine standard is reconstituted with 100 µl of deionized H$_2$O to generate 100 mM Creatinine Standard. For the colorimetric assay the creatinine standard is diluted a hundred times in Assay Buffer to generate a working stock solution of 1 nmol/µl. A dilution series is prepared where 0, 2, 4, 6, 8 and 10 µl of the working solution is mixed in assay buffer to a final volume of 50 µl.

For each sample a reaction mix is prepared with the following volumes.
Assay Buffer: 42 µl
Creatinase 2 µl
Creatininase: 2 µl
Enzyme mix: 2 µl
Probe: 2 µl The background reaction mix contains the same reagents except for Creatininase. The amount of Assay Buffer is 44 µl instead. The standard samples (50 µl) are mixed with the reaction mix (50 µl), incubated at 37° C. for one hour. O.D. is measured in micro cuvettes at 570 nm and the background is subtracted from all the samples. O.D. is then plotted against the concentration to generate a standard curve.

For creatinine samples in hollow fibers the same procedure will be done where the up-concentrated sample will be diluted 100 times in Assay Buffer and 50 µl of the resulting sample will be mixed with 50 µl of the reaction mix. The measured O.D. value will be measured and the concentration of the sample will be determined from the standard curves.

REFERENCES

All documents mentioned in this specification are incorporated herein by reference in their entirety.

Panu Sukitpaneenit and Tai-Shung Chung, Environmental Science & Technology, 2012, 46, 7358-7365
Niwa T. Nagoya J Med Sci. 2010 February; 72(1-2):1-11.
Niwa T, Nomura T, Sugiyama S, et al.: The protein metabolite hypothesis, a model for the progression of renal failure: an oral adsorbent lowers indoxyl sulfate levels in undialyzed uraemic patients. Kidney Int 1997; 52:S23-S28.
Wenhao Xie (2011) Alteration of Membrane Properties during Continuous Hemofiltration
Therapy in vivo (dissertation, http://darwin.bth.rwth-aachen.de/opus3/volltexte/2011/3556/pdf/3556.pdf).
Halo Aoike, Required Water Quality for the Use of High-Performance Membranes in
Saito A, Kawanishi H, Yamashita A C, Mineshima M (eds): High-Performance Membrane Dialyzers. Contrib Nephrol. Basel, Karger, 2011, vol 173, pp 53-57.
Clark & Gao, Properties of Membranes Used for Hemodialysis Therapy. Seminars in Dialysis, Vol 15, No. 1 (January-February) 2002, pp 191-195.
Qian Yang, Kai Yu Wang, Tai-Shung Chung. Dual-Layer Hollow Fibers with Enhanced Flux as Novel Forward Osmosis Membranes for Water Production. Environ. Sci. Technol. 2009, 43, 2800-2805.
Peinemann et al. US published patent application No. 2007/0199892.
Maria Karlsson et al. (FEBS Letters 537 (2003) 68-72).
Jensen et al. US 2012/0080377 A1.
Baihai Su, Shudong Sun and Changsheng Zhao (2011). Polyethersulfone Hollow Fiber Membranes for Hemodialysis, Progress in Hemodialysis—From Emergent Biotechnology to Clinical Practice, Prof. Angelo Carpi (Ed.), ISBN: 978-953-307-377-4, InTech, Available from: Retrieved from the Internet: (<URL: http://www.intechopen.com/books/progress-in-hemodialysis-from-emergent-biotechnology-to-clinical-practice/polyethersulfone-hollow-fiber-membranes-for-hemodialysis>)

"Polyethersulfone Hollow Fiber Membranes for Hemodialysis" Chapter 4, p. 65-88, in Progress in Hemodialysis—From Emergent Biotechnology to Clinical Practice, Edited by Angelo Carpi, Carlo Donadio and Gianfranco Tramonti, Published by InTech 2011, Janeza Trdine 9, 51000 Rijeka, Croatia. [retrieved on 2012 Nov. 9].

Kotelyanskii, M. J., Wagner, N. J., Paulaitis, M. E.: Atomistic simulation of water and salt transport in the reverse osmosis membrane ft-30. J. Membr. Sci. 139, 1-16 (1998).

Wang et al. Structure, Volume 13, Issue 8, August 2005, Pages 1107-1118.

U.S. Pat. No. 4,277,344.

Membrana GMBH [Retrieved on 2012 Dec. 15] Retrieved from the internet (:<URL: http://www.membranafiltration.com/filtration-modules/product-information/ultra-pestm-membrane-fiber.cfm>).

Kotelyanskii, M. J., Wagner, N. J., Paulaitis, M. E.: Atomistic simulation of water and salt transport in the reverse osmosis membrane ft-30. J. Membr. Sci. 139, 1-16 (1998).

Zhang, P., Fu, X., Chung, T.-S., Weber, M. and Maletzko, C.: Development of Thin-Film Composite forward Osmosis Hollow Fiber Membranes Using Direct Sulfonated Polyphenylenesulfone (sPPSU) as Membrane Substrates. Environ. Sci. Technol., 2013, 47 (13), pp 7430-7436.

The invention claimed is:

1. A hollow porous fiber (HF) module having fibers modified with a thin film composite (TFC) layer comprising aquaporin water channels, wherein the TFC layer is a polyamide layer provided on the inside of the fibers.

2. The HF module according to claim 1, wherein said aquaporin water channels are selected from the group consisting of AqpZ channels and SoPIP2;1 water channels.

3. The HF module according to claim 1, wherein the fiber area is from about 0.1 cm² to about 0.5 m².

4. The HF module of claim 1, wherein said aquaporin water channels are incorporated in vesicles before incorporation into the TFC layer.

5. The HF module of claim 4, wherein said vesicles into which the aquaporin water channels are incorporated are liposomes or polymersomes.

6. The HF module of claim 5, wherein said liposomes are prepared from lipids selected from the group consisting of DPhPC, DOPC, mixed soy bean lipids, asolectin and E. coli mixed lipids.

7. The HF module of claim 6, wherein said polymersomes comprise triblock copolymers of the hydrophile-hydrophobe-hydrophile (A-B-A or A-B-C) type, diblock copolymers of the hydrophile-hydrophobe type (A-B), or a combination thereof.

8. The HF module according to claim 4, wherein said TFC layer is formed through interfacial polymerization of an aqueous solution of a di- or triamine with a solution of di- or triacyl halide in an organic solvent, and wherein the aquaporin water channel vesicles are incorporated in said aqueous solution.

9. The HF module of claim 1, wherein the fibers are polyethersulfone fibers.

10. A method of preparing a hollow fiber module comprising porous HF membranes modified on the inside of the fibers with a thin film composite (TFC) layer comprising aquaporin water channels, said method comprising the steps of:

a) obtaining an aquaporin vesicles suspension, wherein said vesicles are proteoliposomes or proteopolymersomes having from about 25 to about 500 LPR/POPR of protein, b) preparing an aqueous solution of a di- or triamine, c) dissolving a di- or triacyl halide in an apolar organic solvent, d) preparing a mixture of amine and aquaporin vesicle by dissolving/mixing the vesicles preparation from step a) with the solution from step b), e) pumping the mixture from step d) through the lumen of the hollow fibers in a hollow fiber module using its end inlet, f) removing excess aqueous solution by a gas purging of the lumen side of the fibers using a module inlet, g) injecting the acyl halide solution from step c) into the module through the lumen of the hollow fibers to allow an interfacial polymerization reaction to take place, and h) rinsing the module with an aqueous solvent by injection through a module inlet.

11. A porous hollow fiber membrane modified with a thin film composite (TFC) layer comprising aquaporin water channels, wherein the TFC layer is a polyamide layer provided on the inside of the fibers.

12. The HF membrane according to claim 11, wherein said aquaporin water channels are selected from the group consisting of AqpZ channels and SoPIP2;1 water channels.

13. The HF module of claim 11, wherein said aquaporin water channels are incorporated in vesicles before incorporation into the TFC layer.

14. The HF module of claim 13, wherein said vesicles into which the aquaporin water channels are incorporated are liposomes or polymersomes.

15. The HF module of claim 14, wherein said liposomes are prepared from lipids selected from the group consisting of DPhPC, DOPC, mixed soy bean lipids, asolectin and E. coli mixed lipids.

16. The HF module of claim 15, wherein said polymersomes comprise triblock copolymers of the hydrophile-hydrophobe-hydrophile (A-B-A or A-B-C) type, diblock copolymers of the hydrophile-hydrophobe type (A-B), or a combination thereof.

17. The HF membrane according to claim 13, wherein said TFC layer is formed through interfacial polymerization of an aqueous solution of a di- or triamine with a solution of a di- or triacyl halide in an organic solvent, and wherein the aquaporin water channel vesicles are incorporated in said aqueous solution.

18. The HF module of claim 11, wherein the fibers are polyethersulfone fibers.

19. The method of claim 10, wherein the fibers are polyethersulfone fibers.

20. The method according to claim 10, wherein the method comprises the steps of a) obtaining an aquaporin vesicles suspension, wherein said vesicles are proteoliposomes or proteopolymersomes having from about 25 to about 500 LPR/POPR of protein, b) preparing an aqueous solution of 1,3-diaminobenzene of about 1% to about 5% (w/w) concentration, c) dissolving benzene-1,3,5-tricarbonyl chloride in an organic solvent selected from the group consisting of hexane, heptane, octane or a mixture of solvents to obtain a concentration of about 0.05% to about 1% (w/v), d) preparing an 1,3-diaminobenzene/aquaporin vesicle mixture by dissolving/mixing the vesicles preparation from step a) with the solution from step b),
e) pumping the mixture from step d) through the lumen of the hollow fibers in a hollow fiber module using its end inlet,
f) removing excess aqueous solution by a gas purging of the lumen side of the fibers using a module inlet,
g) injecting the benzene-1,3,5-tricarbonyl chloride solution from step c) into the module through the lumen of the hollow fibers to allow an interfacial polymerization reaction to take place, and
h) rinsing the module with an aqueous solvent by injection through a module inlet.

21. The method according to claim 10, wherein in step f) the fibers are gas purged to dryness and wherein the module is held upside down in step f).

* * * * *